Oct. 13, 1953          E. B. SNEAD                    2,655,253
              SUPPORTING AND AUXILIARY DRIVING
                  MEANS FOR CONVEYER BELTS
Filed May 15, 1952                              2 Sheets-Sheet 1
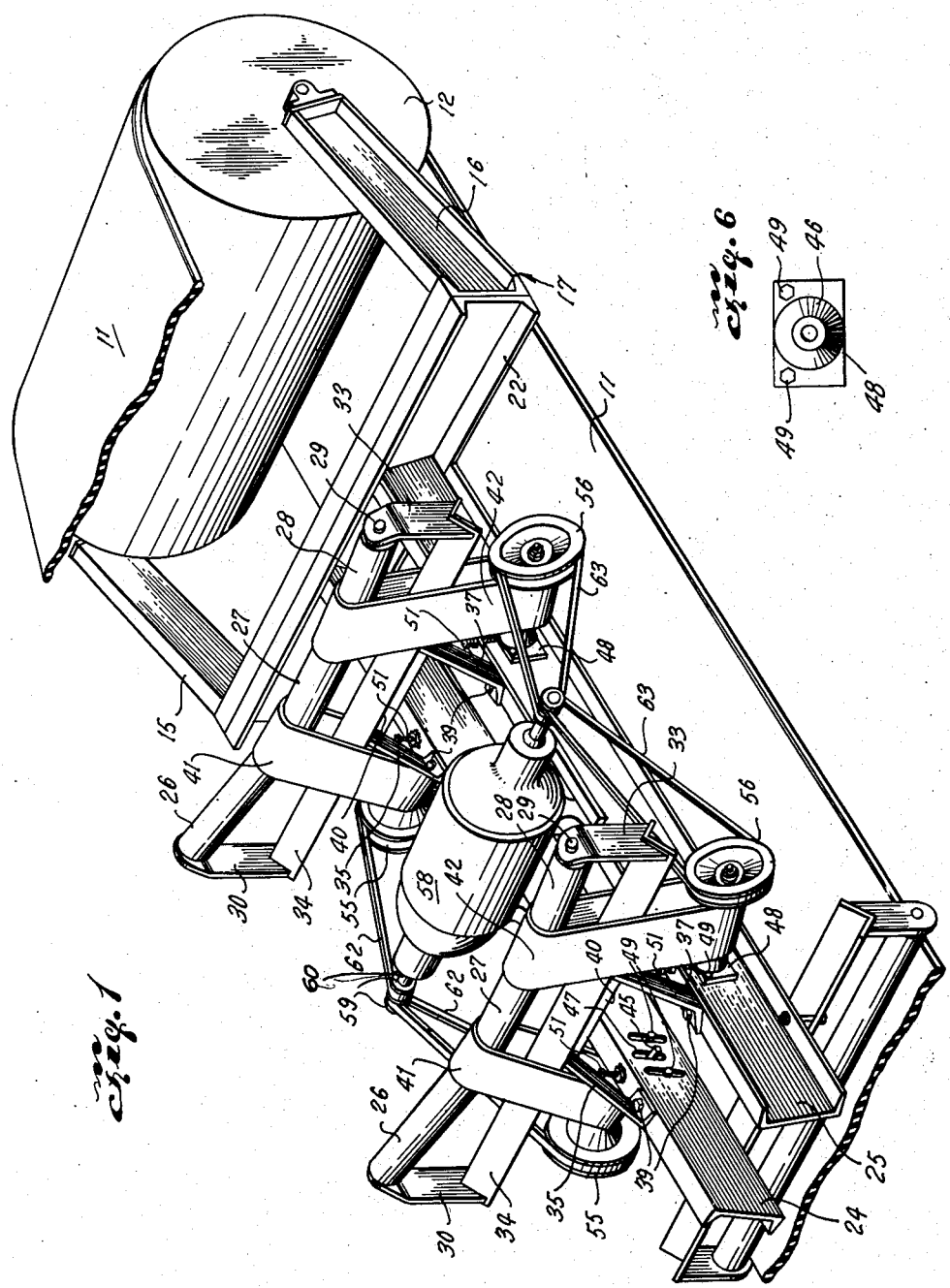
INVENTOR.
EDWIN B. SNEAD
BY
ATTORNEY

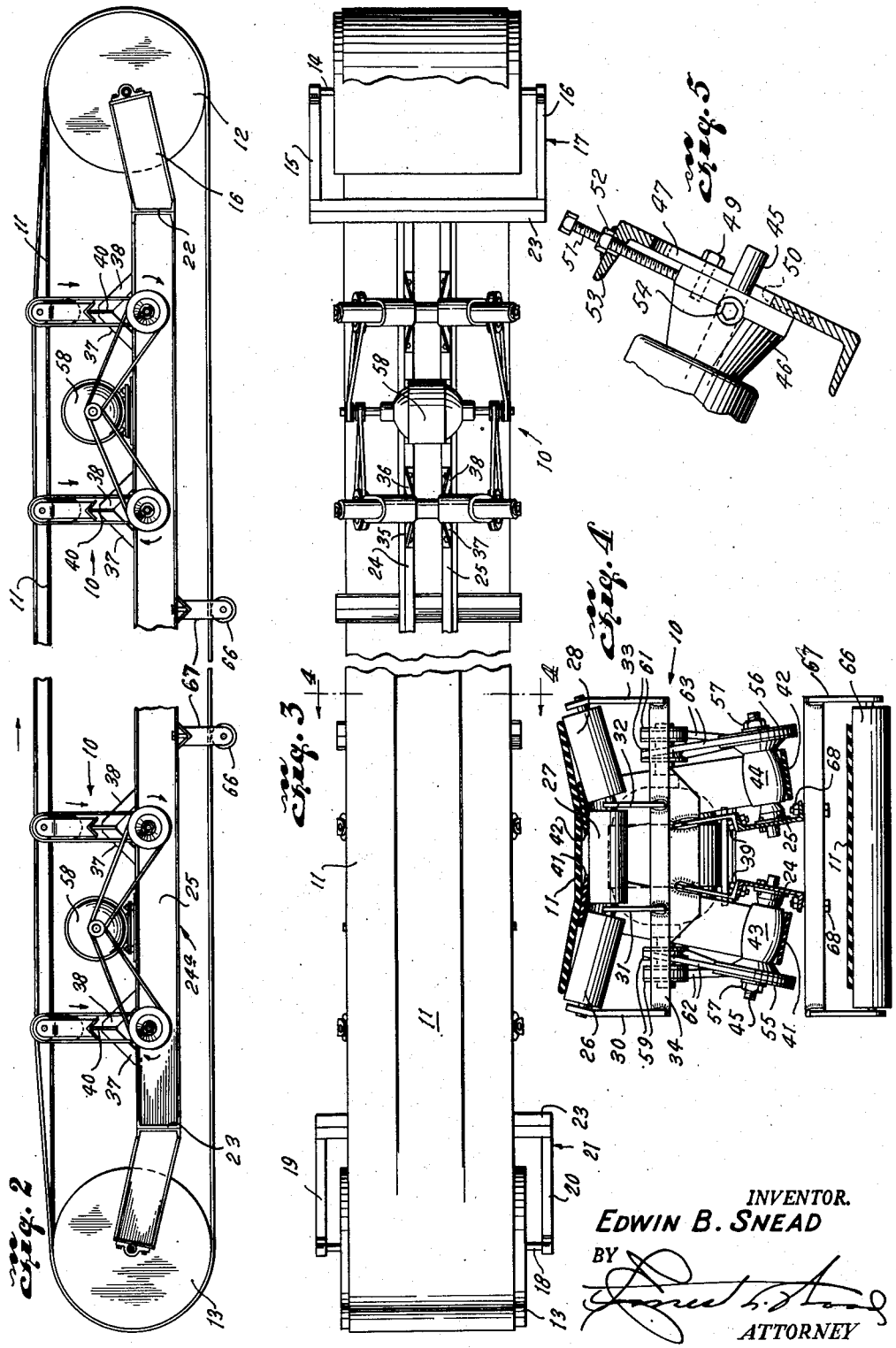

Patented Oct. 13, 1953

2,655,253

UNITED STATES PATENT OFFICE 2,655,253

SUPPORTING AND AUXILIARY DRIVING MEANS FOR CONVEYER BELTS

Edwin B. Snead, Austin, Tex.

Application May 15, 1952, Serial No. 287,941

6 Claims. (Cl. 198—203)

1

This invention relates to conveyors and more particularly to a supporting and auxiliary driving means for conveyor belts.

In conventional conveyors utilizing endless belts, it is conventional to drive the belts by the application of power to a drive pulley disposed at the discharge end of the conveyor. Where long conveyor belts are employed, the application of power at one position creates excessive tension on the belt, the practical length of the belt being limited by the strength of the belt. The amount of material which can be transported by the belt is limited by the strength of the belt and the distance between supporting pulleys or idlers. In order to enable the use of extremely long belts and obviate the need of transfer points, it is desirable to provide a means not only for supporting the conveyor belt at points located between the drive and idler pulleys but also for driving the conveyor belt at points other than at the discharge end of the conveyor.

Accordingly, it is an object of the invention to provide a new and improved supporting and auxiliary driving means for belt conveyors.

It is another object of the invention to provide a new and improved supporting and auxiliary driving means for belt conveyors for supporting and driving such belts at several points located at positions removed from the discharge end of the conveyor.

It is still another object of the invention to provide a new and improved supporting and auxiliary drive means for belt conveyors which includes a plurality of spaced belt supporting and drive units disposed along the length of the conveyor belt for supporting and driving the conveyor belt.

For a better understanding of the invention, reference may be had to the following description taken in connection with the accompanying drawing and its scope will be pointed out in the appended claims.

In the drawing,

Figure 1 is a perspective view of the supporting and auxiliary drive means for belt conveyors;

Figure 2 is a side plan view of a belt conveyor provided with a pair of the supporting and auxiliary drive means;

Figure 3 is a top plan view of the belt conveyor of Figure 2 with a portion of the belt removed to show one of the supporting and auxiliary drive means;

Figure 4 is a sectional view taken on the line 4—4 of Figure 3;

Figure 5 is a sectional view showing the details of a drive belt tightening device; and,

2

Figure 6 is a plan view of a component of the drive belt tightening device.

In the drawing, the reference character 10 designates generally a supporting and auxiliary drive means or unit for a conveyor belt 11 which extends about a pair of end pulleys 12 and 13. The end pulley 12 is mounted on a shaft 14 rotatably mounted on the side arms 15 and 16 of a U-shaped bracket 17. The end pulley may be a drive pulley in which case a sprocket (not shown) could be mounted on the shaft 14 by means of which the pulley 12 could be rotated or driven from any suitable prime mover, such as an electric motor. The end pulley 13 is similarly mounted on a shaft 18 rotatably mounted on the side arms 19 and 20 of a U-shaped bracket 21.

The brackets 17 and 21 are rigidly secured by welding or in any other suitable manner to the end cross-members 22 and 23, respectively of a frame 24a. A pair of longitudinal members 24 and 25 of the frame extend between the end cross-members 22 and 23 and are rigidly secured thereto by welding or in any other suitable manner. The frame 24a may be mounted on any fixed structure by conventional supports, not shown.

Each of the supporting and auxiliary drive means includes two sets of supporting rollers 26, 27 and 28 mounted on shafts 29. The shafts 29 have upturned end portions so that the rollers 26 and 28 are inclined upwardly and outwardly and define a trough in conjunction with the center roller 27. Each shaft 29 is mounted on four vertical bars 30, 31, 32 and 33 which extend upwardly from transverse angle irons 34. The transverse angle irons in turn are mounted on supporting bars 35, 36, 37, and 38 which are secured to the longitudinal members 24 and 25 of the frame 24 by means of bolts 39. The supporting bars are welded at their upper ends to a transverse plate 40 extending downwardly from the angle irons 34 and welded thereto.

A pair of driving belts 41 and 42 extend about adjacent end portions of the rollers 26 and 27 and of the rollers 27 and 28, respectively. The belt 41 extends about a pulley roller 43 mounted on the longitudinal member 24. The belt 42 similarly extends about a pulley roller 44 mounted on the longitudinal member 25.

Each pulley roller 43 and 44 is rotatably mounted on a shaft 45 which extends through a block 46 (Figure 5) and a slot 47 in the longitudinal member on which the block is adjustably mounted. Each bearing block is provided with side flanges 48 provided with threaded apertures which receive bolts 49 which extend through slots 50 in the longitudinal member 24 or 25 on which the block is adjustably mounted. A screw 51 extends through a threaded nut 52 welded to the upper flange 53 of the longitudinal member and through an aperture in the flange. The lower end of the screw bears against the block so that by rotation of the screw the position of the block 46 may be adjusted. The bolts 49 are tightened after each adjustment of the screw to retain the block in the adjusted position. The block is secured to the shaft 45 by a set screw 54. It will be evident that the screw 51 may be used as a tension adjusting means for the driving belts 41 and 42.

The pulley rollers 43 and 44 are provided at their outer ends with a V-belt pulley 55 and 56, respectively, integral with the pulley rollers. A nut 57 on the threaded end of each shaft 45 retains the pulley rollers on the shafts 45. The pulley rollers are driven by a motor 58 mounted on the longitudinal members 24 and 25 by bolts or in any other suitable manner. A pair of V-belt pulleys 59 are mounted on one end of the drive shaft 60 of the motor and a pair of pulleys 61 are mounted on the other end of the shaft. A pair of V-belts 62 extend around the pulleys 59 on the drive shaft and about the V-belt pulleys 55 of the pulley rollers 43. Similarly, a pair of V-belts 63 extend around the pulleys 61 of the pulley rollers 44. It will be evident that when the motor 58 is operating, the pulley rollers 43 and 44 will be rotated by the V-belts 62 and 63, respectively, and will cause the driving belts 41 and 42 to rotate the supporting rollers 26, 27 and 28 and also to move or drive the conveyor belt 11 since it rests upon the drive belts 41 and 42 where the latter extend around the supporting rollers. In addition, the conveyor belt contacts the supporting rollers and, since the latter are rotated by the drive belts, the supporting rollers also drive the conveyor belt.

Idler rollers 66 may be mounted on and beneath the longitudinal members by means of brackets 67 secured to the longitudinal members by bolts 68. The idler rollers 66 prevent the conveyor belt 11 from falling below a desired level.

Each supporting and auxiliary drive means or unit 10 preferably includes two sets of supporting rollers 26, 27 and 28, as illustrated, disposed on opposite sides of the motor 58 so that a single motor may be used to drive both sets of the supporting rollers.

The number of supporting and auxiliary drive means and units employed with each belt conveyor depends on the length of the conveyor belt 11, as many units being mounted on the longitudinal members 24 and 25 as are needed. The motors are driven at the same speed. The supporting rollers 26, 27 and 28 of each drive unit cause the conveyor belt to bend into a trough shape and support the conveyor belt and its load. In addition, the drive belts 41 and 42 and the supporting rollers drive the conveyor belt 11 at a plurality of points spaced along the length of the conveyor belt so that the driving force is applied to the conveyor belt not at one point by a drive pulley 12 as in conventional conveyors but at many points spaced along the length of the conveyor. As a result, very long conveyor belts may be used to carry great loads of material by providing the conveyor with the described supporting and auxiliary drive means or units. The drive belts 41 and 42 cause the driving force to be applied along substantially the whole width of the conveyor belt, since all supporting rollers are rotated by the driving belts, thus preventing excessive forces from being applied to the conveyor belt at points along its width.

Manifestly, the construction as shown and described is capable of some modification and such modification as may be construed to fall within the scope and meaning of the appended claims is also considered to be within the spirit and intent of the invention.

What is claimed is:

1. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, said endless belt resting on said drive belts and said supporting rollers, and means for simultaneously driving the drive belts of both sets of supporting rollers.

2. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, said endless belt resting on said drive belts and said supporting rollers, and a motor for simultaneously driving the drive belts of both sets of supporting rollers.

3. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, said endless belt resting on said drive belts and said supporting rollers, drive pulleys for said drive belts; a motor; and means connecting said motor to said drive pulleys for simultaneously driving the drive belts of both sets of supporting rollers.

4. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, the outer rollers of each set being disposed in outwardly and upwardly inclined positions whereby said supporting rollers define a trough, a plurality of drive belts, each drive belt overlapping adjacent portions of a pair of adjacent supporting rollers, said endless belt resting on said drive belts and said supporting rollers, and means for simultaneously driving the drive belts of both sets of supporting rollers.

5. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, the outer rollers of each set being disposed in outwardly and upwardly inclined positions whereby said supporting rollers define a trough, a plurality of drive belts, each drive belt overlapping adjacent portions of a pair of adjacent supporting rollers, said endless belt resting on said drive belts and said supporting rollers, and a motor for simultaneously driving the drive belts of both sets of supporting rollers.

6. A supporting and auxiliary drive means for a conveyor having an endless belt comprising, a pair of longitudinally spaced sets of supporting rollers for supporting said endless belt at longitudinally spaced points along its length, each of said sets including a plurality of transversely aligned supporting rollers, a plurality of drive belts, each drive belt overlapping adjacent portions of a pair of adjacent supporting rollers, the outer rollers of each set being disposed in outwardly and upwardly inclined positions whereby said supporting rollers define a trough, a plurality of drive belts, each drive belt overlapping adjacent portions of a pair of adjacent supporting rollers, said endless belt resting on said drive belts and said supporting rollers, drive pulleys for said drive belts; a motor; and means connecting said motor to said drive pulleys for simultaneously driving the drive belts of both sets of supporting rollers.

EDWIN B. SNEAD.

References Cited in the file of this patent

UNITED STATES PATENTS

| Number | Name | Date |
|---|---|---|
| 1,313,111 | Page | Aug. 12, 1919 |
| 1,626,041 | Kyle et al. | Apr. 26, 1927 |